United States Patent
Regan

(10) Patent No.: US 9,924,042 B2
(45) Date of Patent: Mar. 20, 2018

(54) UNIFORM RCS VOICE/VIDEOMAIL SERVICES

(71) Applicant: Cellco Partnership, Basking Ridge, NJ (US)

(72) Inventor: Rodney Dale Regan, Somerville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 565 days.

(21) Appl. No.: 14/140,899

(22) Filed: Dec. 26, 2013

(65) Prior Publication Data

US 2015/0189090 A1 Jul. 2, 2015

(51) Int. Cl.
*H04M 3/53* (2006.01)
*H04M 3/533* (2006.01)
*H04M 3/537* (2006.01)

(52) U.S. Cl.
CPC ..... *H04M 3/53333* (2013.01); *H04M 3/5315* (2013.01); *H04M 3/537* (2013.01)

(58) Field of Classification Search
USPC ........................................................ 455/466
See application file for complete search history.

(56) References Cited

U.S. PATENT DOCUMENTS

| | | | |
|---|---|---|---|
| 8,331,963 B1 | 12/2012 | Lin et al. | |
| 8,495,226 B2 | 7/2013 | Lau | |
| 8,705,709 B2 * | 4/2014 | Hao | H04M 3/53333 379/179 |
| 2001/0034225 A1 * | 10/2001 | Gupte | H04L 51/24 455/412.2 |
| 2003/0139193 A1 * | 7/2003 | Buckley | H04W 80/00 455/466 |
| 2006/0025164 A1 * | 2/2006 | Wang | H04L 51/04 455/466 |
| 2009/0265552 A1 * | 10/2009 | Moshir | H04L 63/0464 713/168 |
| 2009/0279681 A1 | 11/2009 | McKee et al. | |
| 2010/0056118 A1 * | 3/2010 | Galicia | H04M 3/5307 455/414.4 |
| 2010/0167762 A1 | 7/2010 | Pandey et al. | |
| 2011/0098021 A1 | 4/2011 | Shaw et al. | |
| 2011/0201363 A1 * | 8/2011 | Shim | H04L 67/30 455/466 |
| 2012/0225652 A1 * | 9/2012 | Martinez | H04M 3/42374 455/435.1 |

(Continued)

*Primary Examiner* — Steven Kelley

(57) ABSTRACT

Videomail and/or voicemail methods for mobile devices and systems are provided. A communication session request is received from a source device for communication with a destination device. Responsive to the request, it is determined whether the requested session will be established with the destination device. When the requested session will not be established with the destination device, the source device is caused to present a message request to a source device user. Responsive to the message request, a message generated by the source device user is received which includes at least one of video or audio information. A file transfer (FT) message is generated from the received message. The FT message is temporarily stored on a messaging server, and is sent to the destination device via the messaging server, without maintaining a stored copy of the FT message on the messaging server.

20 Claims, 7 Drawing Sheets

(56) References Cited

U.S. PATENT DOCUMENTS

| | | | |
|---|---|---|---|
| 2012/0276877 A1* | 11/2012 | Balannik | H04M 1/57 |
| | | | 455/412.2 |
| 2013/0024574 A1 | 1/2013 | Lau et al. | |
| 2013/0040612 A1* | 2/2013 | Kumar | H04M 3/42382 |
| | | | 455/413 |
| 2013/0053027 A1 | 2/2013 | Lau et al. | |
| 2013/0165081 A1* | 6/2013 | Wuthnow | H04N 21/235 |
| | | | 455/411 |
| 2014/0018053 A1* | 1/2014 | Cho | G06F 3/0488 |
| | | | 455/418 |
| 2015/0222753 A1* | 8/2015 | Noldus | H04L 65/1069 |
| | | | 455/412.2 |
| 2016/0286027 A1* | 9/2016 | Lee | H04M 1/72552 |

\* cited by examiner

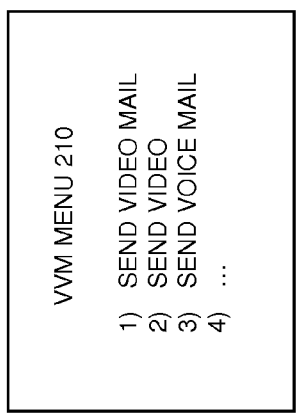
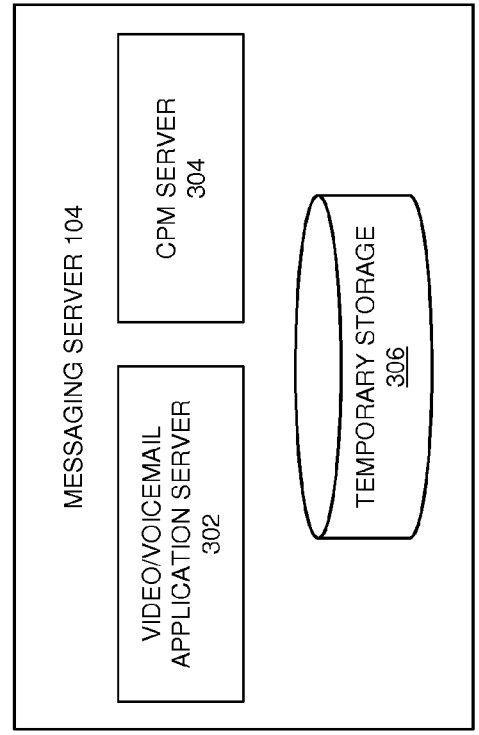

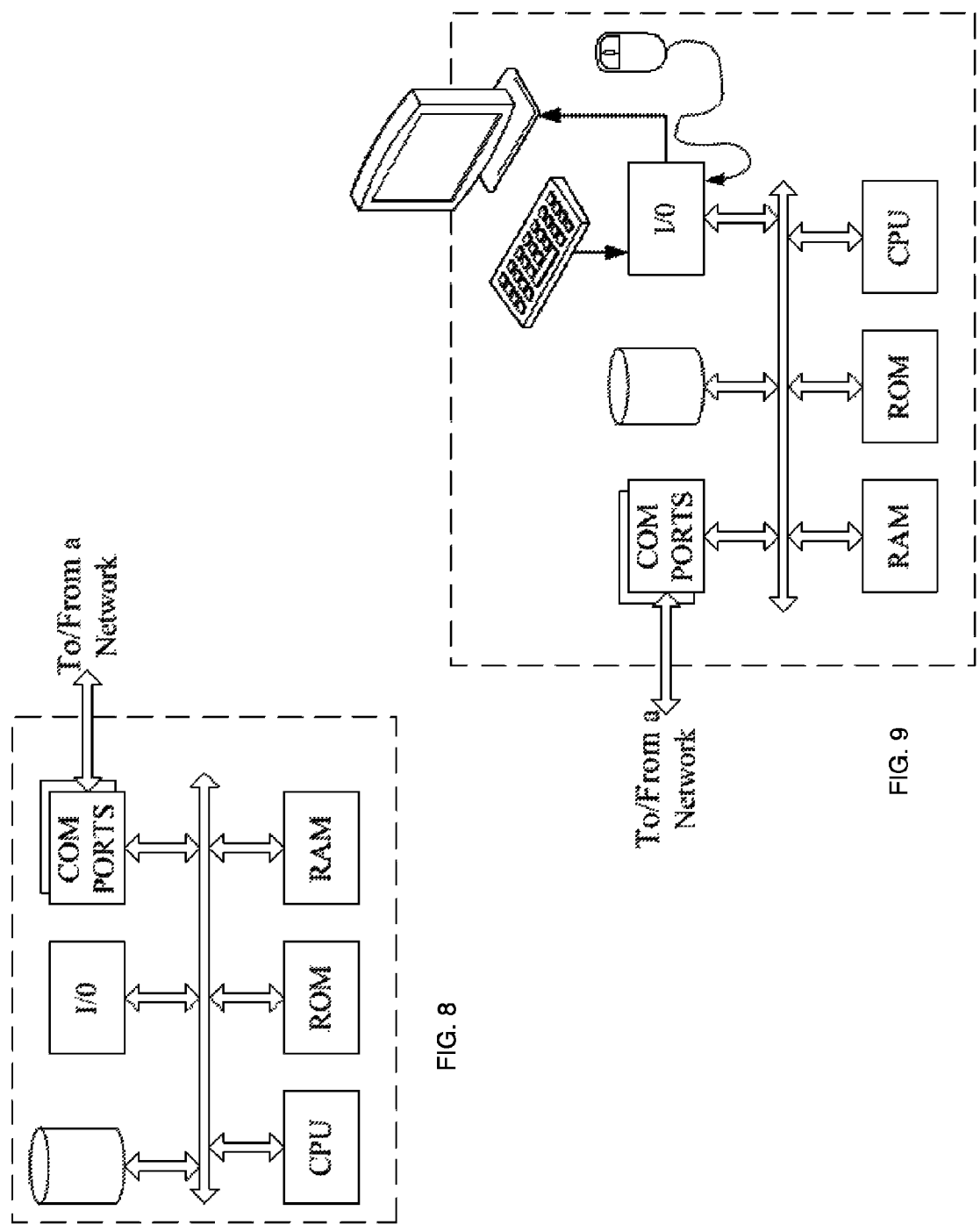

UNIFORM RCS VOICE/VIDEOMAIL SERVICES

BACKGROUND

Mobile communication services have expanded and increased in popularity around the world. Many advanced networks offer wireless mobile communication service for voice calls, mobile phone messaging services (e.g., text and/or multimedia) and data communications. The data services, for example, enable surfing the world wide web, e.g., via a browser. The speeds of the data communications services have steadily increased as service providers have migrated the networks to newer generation technologies with broadband data communication capabilities, and the communication devices have steadily advanced to take advantage of the new network technologies. The data communication capabilities of the communication devices and the broadband data communication services offered by the networks enable users to perform more and more tasks from their communication devices.

The expanding capabilities of mobile communications devices have allowed the improvement and enhancement of more traditional technologies. Currently available network technologies can enable user devices to communicate with one another using a variety of communication services, such as cellular services, voice over Internet Protocol (voice over IP, VoIP) services, short messaging service (SMS), instant messaging (IM) services and other types of communication services. For example, voicemail is traditionally an audio-only feature that requires a telephone connection to a voicemail server. A sending device attempts to establish a call with a destination device. If the destination device is unavailable, the sending device can record an audio message (i.e., a voicemail message), which is stored at a messaging server in or coupled to the network serving the destination device. The destination device receives a message waiting notification that a voicemail is available at the messaging server, and the user would then dial into a voicemail server to listen to the message. Videomail services also exist for recording video messages (i.e., a videomail messages). For example, a videomail message can be recorded and stored at a messaging server when a video call cannot be established with a destination device.

A need exists for improved technologies for voice and videomail messaging services.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A is a high-level functional block diagram of a few elements of a client device as may utilize the voice/videomail messaging service through a system like that shown in FIG. 1.

FIG. 2B is an example of a voice/videomail menu that may be utilized for generating a message request (e.g., as a prompt to a user) for the voice/videomail messaging service through a client device like that shown in FIG. 2A.

FIG. 3 is a high-level functional block diagram of an example of a messaging server of the system shown in FIG. 1.

FIG. 8 is a simplified functional block diagram of a computer that may be configured as a host or server, for example, to function as the communication session controller or the messaging server in the system of FIG. 1.

FIG. 9 is a simplified functional block diagram of a personal computer or other work station or terminal device.

DETAILED DESCRIPTION OF EXAMPLES

Figure 1:
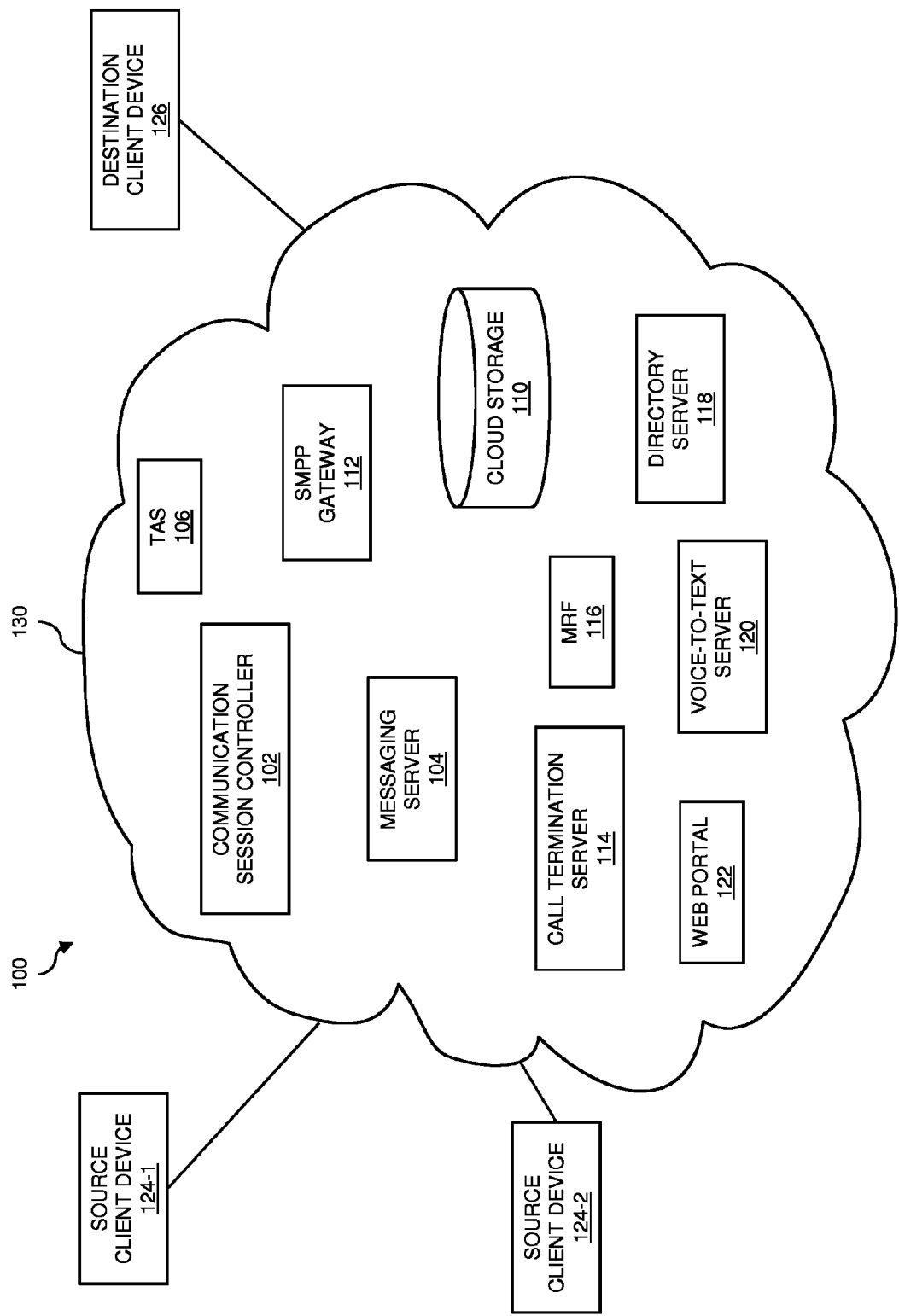
FIG. 1 is a high-level functional block diagram of an example of a system of a network and devices that provide various communications for client devices and supports an example of a system for implementing a voice/videomail messaging service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various methods discussed by way of examples below relate to voice/videomail messaging services for Internet Protocol Multimedia Subsystem (IMS) networked client devices. IMS is an architectural framework for delivering Internet Protocol (IP) multimedia services. IMS uses the Session Initiation Protocol (SIP) to provide integration with the Internet. It provides access of multimedia and voice applications from wireless and wireline user equipment (UE) terminals. A user can connect to IMS in different ways, including the standard Internet Protocol (IP). IMS terminals (e.g., mobile phones, computers, and personal digital assistants (PDAs)) can register directly on IMS, even when they are roaming in a different network, as long as IP and SIP are accessible. Mobile access (e.g., 4G Long Term Evolution (LTE), code division multiple access (CDMA), Global System for Mobile (GSM), General Packet Radio Server (GPRS)), wireless access (e.g., wireless local area network (WLAN), Worldwide Interoperability for Microwave Access (WiMAX)), and fixed access (e.g., cable modems, Ethernet, digital subscriber line (DSL)) are all supported. Other phone systems, like plain old telephone service (POTS) and non-IMS compatible VoIP systems, are supported through gateways.

The examples involve configuration of a Rich Communication Suite (RCS) system in an IMS network that provides the ability to use the RCS service to generate voice/videomail messages that are stored at the destination device. RCS defines interoperable communications services to be adopted by network operators and mobile handset manufacturers. RCS adopts various existing standards and defines how they should be implemented; and that the RCS system uses the IMS to provide the framework for these services. Examples of communication services provided by RCS include chat, file transfer, image share and video share, enhanced address book (EAB), including service capability and social presence, network address book (NAB), including remote backup and restore and enhanced messaging, including message history.

An example RCS system for the mail service causes a source device to present a message request to a user of the source device responsive to an indication that a requested communication session will not be established with the destination device. A message that includes video and/or audio information is generated by a user of the source device for the destination device responsive to the message request. A file transfer (FT) message is generated from the message according to a predetermined file transfer protocol. The FT message may be temporarily stored on a messaging server of the RCS system. The FT message is sent to the destination device via the messaging server, without maintaining a stored copy of the FT message on the messaging server after the FT message is sent to the destination device. Thus, the final storage of the FT message is on the destination device. The approach reduces the need for the mail service provider to store messages on the network-connected server equipment that provides the mail service. Because the VVM message is ultimately sent to the destination device in a file transfer format (as a FT message), VVM message content of any size can be transferred and stored at the destination device.

For source devices that are voice/videomail service-capable devices, the FT message generation may be performed by the source device. For source devices that are voice/videomail service-incapable devices, the FT message generation may be performed by the messaging server. A communication session controller may use various application servers, such as a telephony application server (TAS), to determine whether a requested communication session (received from the source device) will be established with the destination device.

Reference now is made in detail to the examples illustrated in the accompanying drawings and discussed below. FIG. 1 illustrates a system 100 offering a variety of mobile communication services, including voice/videomail (VVM) messaging services for client devices. System 100 may make the VVM messaging service available for VVM service-capable devices (such as source client device 124-1) and for VVM service-incapable source client devices (such as source client device 124-2). In general, VVM messaging services relate to the generation and delivery of mail messages for unanswered calls to destination devices such as destination device 126. The mail messages include video and/or audio information. For example, the mail messages may include video mail messages, voice mail messages, etc. Example VVM messaging services provide device-to-device message transmission without long term storage of the message in a messaging server.

The example shows simply two source client devices 124-1, 124-2 and one destination client device 126, as well as a mobile communication network 130. The client devices 124-1, 124-2 and 126 are examples of client devices that may use the VVM messaging service. However, the network 130 may provide similar communications for many other similar users as well as for client devices/users that do not participate in the VVM messaging service. In the examples described herein, it is assumed that destination client device 126 is a VVM service-capable device. The destination client device 126 may provide some indication of its status as a VVM service-capable device when communicating with elements of system 100. For example the destination client device 126 may include a VVM service indication in a header with transmission to various elements of system. The source client device 124-1 may include a similar VVM service indication which may be used to identify that the source client device 124-1 is VVM service-capable.

The IMS based network may provide services, including the VVM service, to devices that use a variety of different wired and wireless access technologies, as noted earlier. For discussion of examples, however, we will often assume that the access technology is a mobile public wireless technology (e.g. 4G LTE, etc.), and therefore, the client devices 124-1, 124-2 and 126 are often described as mobile devices. In such a mobile/wireless example, the network 130 provides mobile wireless communications services to those devices as well as to other mobile stations (not shown), for example, via a number of base stations (not shown). The present techniques may be implemented in any of a variety of available mobile networks 130 and/or for any type of IMS terminal compatible with such a network 130, and the drawing shows only a very simplified example of a few relevant elements of the network 130 for purposes of discussion here.

The wireless mobile communication network 130 might be implemented as a network conforming to the CDMA IS-95 standard, the 3rd Generation Partnership Project 2 (3GPP2) wireless IP network standard or the Evolution Data Optimized (EVDO) standard, the GSM communication standard, a time division multiple access (TDMA) standard or other standards used for public mobile wireless communications. The client devices 124-1, 124-2, 126 are capable of voice telephone communications through the network 130, and for the VVM messaging service. The devices 124-1, 124-2, 126 shown by way of examples are capable of data communications through the particular type of network 130 (and the users thereof typically will have subscribed to the data service through the network).

The network 130 allows users of the client devices such as 124-1, 124-2 and 126 (and other mobile stations not shown) to initiate and receive telephone calls to each other as well as through a public switched telephone network (PSTN) (not shown) and telephone stations (not shown) connected to the PSTN. The network 130 typically offers a variety of data services via a global network (e.g., the Internet) (not shown), such as downloads, web browsing, email, etc. The client devices 124-1, 124-2, 126 of users of the VVM messaging service also can receive and execute applications written in various programming languages, as discussed more later.

The mobile communication network 130 can be implemented by a number of interconnected networks. Hence, the overall network 130 may include a number of radio access networks (RANs), as well as regional ground networks interconnecting a number of RANs and a wide area network (WAN) interconnecting the regional ground networks to core network elements. A regional portion of the network 130, such as that serving client devices 124-1, 124-2, 126, can include one or more RANs and a regional circuit and/or packet switched network and associated signaling network facilities. Physical elements of a RAN operated by one of the mobile service providers or carriers include a number of base stations (not shown).

The radio access networks can also include a traffic network represented generally by the cloud at 130, which carries the user communications and data for the client devices 124-1, 124-2, 126 between the base stations and other elements with or through which the client devices communicate. The network can also include other elements that support functionality other than device-to-device media transfer services such as messaging service messages (such as Short Message Service (SMS) messages and Multimedia Messaging Service (MMS) messages) and voice communications. It will be understood that the various network elements can communicate with each other and other aspects of the mobile communications network 130 and other networks (e.g., a PSTN and the Internet) either directly or indirectly.

Although not shown, the carrier may also operate a number of systems that provide ancillary functions in support of the communications services and/or application services provided through the network 130, and those elements may communicate with other nodes or elements of the network 130 via one or more private IP type packet data networks (sometimes referred to as an Intranet), i.e., a private network. Examples of such systems may include one or more application servers and related authentication servers.

In some implementations, network 130 may include one or more IMS network devices (not shown in FIG. 1), such as one or more call session control function (CSCF) devices (e.g., a proxy-CSCF (P-CSCF) device, an interrogating-CSCF (I-CSCF) device, a serving-CSCF (S-CSCF) device, etc.), a home subscriber server (HSS), and/or one or more other types of IMS devices.

The network 130 supports VVM messaging services which enable client device to client device VVM messaging, where the message is received and stored at the destination client device 126, without maintaining a stored copy of the message on the messaging server 104. To this end, network 130 includes communication session controller 102 and messaging server 104. Network 130 may also include one or more of Telephony Application Server (TAS) 106, cloud storage 110, Short Message Peer-to-Peer (SMPP) gateway 112, call termination server 114, Media Resource Function (MRF) 116, directory server 118, voice-to-text server 120 and web portal 122.

In an IMS implementation using SIP for call set-up and tear-down, TAS 106 is a server in the IMS core that sends and receives SIP signaling messages amongst the client devices of the parties involved in or intended to participate in a voice or video call. Cloud storage 110 includes one or more data storage devices for long term storage of FT messages. The SMPP gateway 112 receives notification messages from messaging server 104 and passes the notification messages to destination device 126. The SMPP gateway 112 may provide a number of functions including the ability to allow an ESME (External Short Message Entity (ESME) such as the VVM AS server 302 (FIG. 3) to send all SMS messages to one location with the expectation of delivery. Thus, the SMPP gateway 112 may include logic for determining which SMS messaging center (SMSC) to send the message to, rather than having to open connectivity to many SMSCs from the VVM AS server 302. The notification messages are used to notify destination device 126 that message transfer (of the FT message) can begin. Call termination server 114 is used to terminate a requested communication session originated by source client device 124-2, when the requested session is ended without completion of communication with the destination device. MRF 116 provides media related functions and playing of tones and announcements. MRF 116 also communicates with call termination server 114 and source client device 124-2 to generate a VVM message (described further below). Directory server 118 (for directory lookups) and voice-to-text server 120 (to convert speech to text) may be used by messaging server 104 to generate a FT message and/or to send the FT message to a destination device 126. Web portal 122 is an on-line server providing a web page interface that permits user access to features and functionality of system 100 and may be used to activate and configure the VVM messaging service.

Communication session controller 102 is configured to receive a communication session request from source client device 124 (such as VVM service-capable device 124-1 or VVM service-incapable device 124-2) for communication with destination client device 126. Communication session controller 102 determines whether the requested session will be established with destination client device 126 responsive to the communication session request; and causes the source client device 124-1, 124-2 to present a message request for communication with the destination client device 126 responsive to an indication that the requested session will not be established with the destination client device 126. As described further below, the request (i.e., prompt) to the user may be an audible prompt, a visual prompt or a combination thereof.

Communication session controller 102 may be implemented by one or more computing or communication devices in the network to control aspects of packet based communication sessions through the network 130. For example, communication session controller 102 may include a computer, a server, a cluster of servers, or another type of device capable of operating in a network environment session initiation protocol (SIP) call session control functions (CSCFs). For example, in some implementations, communication session controller 120 may be an S-CSCF server. In other implementations, communicate session controller 120 may include a serving type or "S-CSCF" and/or a proxy type or "P-CSCF." Although communication session controller 102 is illustrated as being a separate device in system 100, communication session controller 102 may be implemented on the source client device 124-1 and/or the messaging server 104.

Destination client device 126 may be unavailable (e.g., busy), the user of destination client device 126 may not answer (even though the destination client device 126 is available) or the called party may opt to monitor (i.e., listen but not connect for responsive communication) from the available destination client device 126. There may also be other scenarios for which lack of call completion may be predefined (e.g., will not take a call from a particular caller for some reason). Thus, scenarios may exist where the destination client device 126 is "available" but where the requested communication session will not be established.

Figure 4:
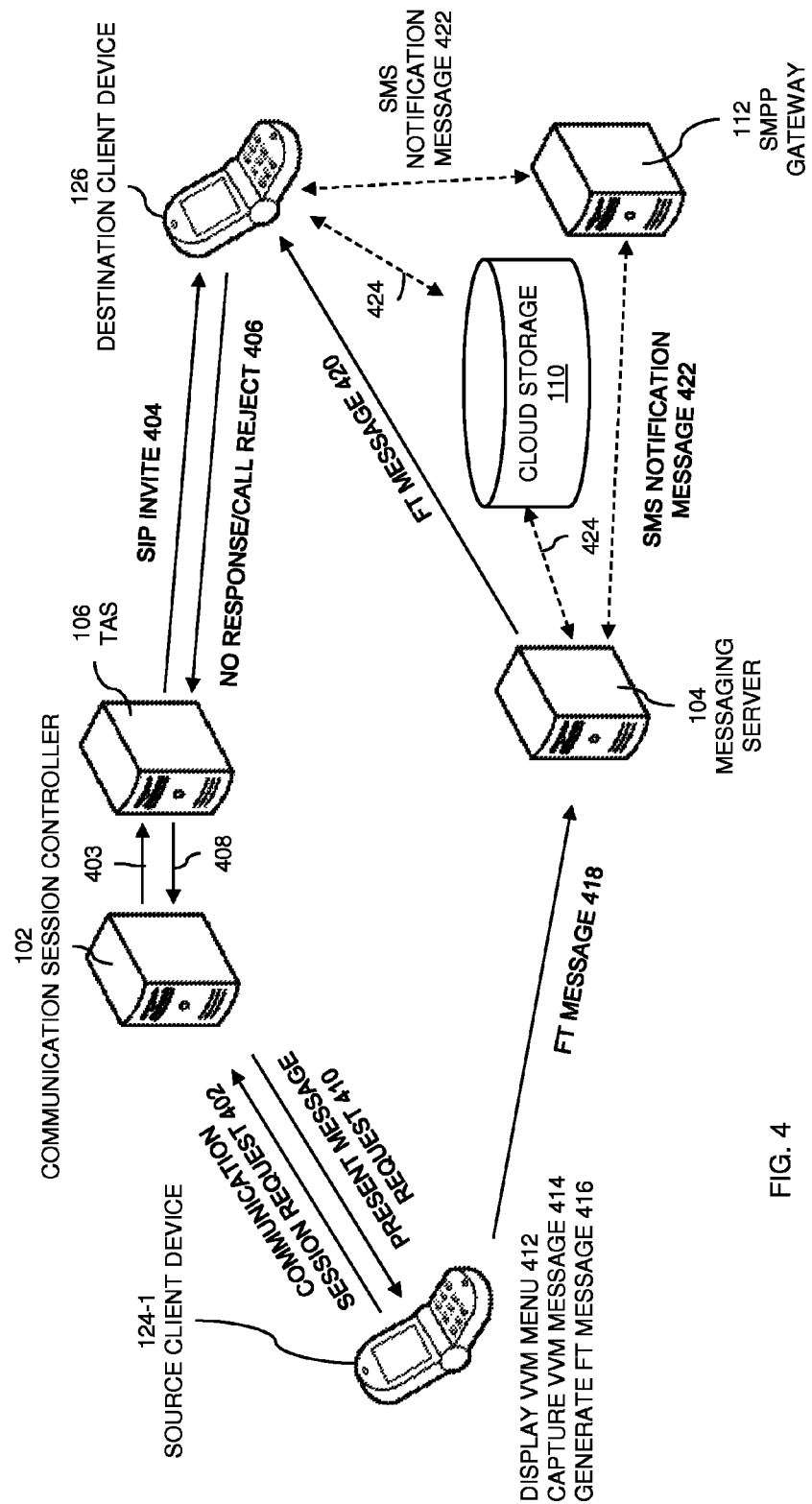
FIG. 4 is a high-level functional block diagram conceptually illustrating voice/videomail messaging systems and services for a voice/videomail service-capable source client device.

Communication session controller 102 may determine whether the source client device 124 is a VVM service-capable device or a VVM service-incapable device for communicating directly or indirectly with the client device to present a message request. For example, the communication session controller 102 may identify whether the source client device 124-1, 124-2 includes a VVM service indication in the communication session request. If the communication session request is received from VVM service-capable device 124-1 (for example, when a VVM service indication is identified), communication session controller 102 may communicate directly with source client device 124-1 (as shown in FIG. 4), to cause the source client device 124-1 to present the message request, when communication session controller 102 determines that the requested session will not be established. If the communication session request is received from VVM service-incapable device 124-2 (for example, when a VVM service indication is not identified), communication session controller 102 may communicate indirectly with source client device 124-2 via call termination server 114 and Media Resource Function (MRF), to cause the source client device 124-2 to present the message request, when communication session controller 102 determines that the requested session will not be established.

Communication session controller 102 is configured to use TAS 106 to determine whether the requested communication session will be established between source client device 124-1, 124-2 and destination client device 126. In an example embodiment, communication session controller 102 also determines whether destination client device 126 supports the VVM messaging service. For example, communication session controller 102 may determine whether destination client device 126 is VVM service-capable by identifying a VVM service indication associated with destination client device 126. Communication session controller 102 may cause source client device 124-1, 124-2 to present a message request when the requested communication session will not be established and destination client device 126 supports the VVM messaging service.

As described further below with respect to FIGS. 4 and 5, communication session controller 102 may direct TAS 106 to send a SIP invite message to destination client device 126 for initiating a communication session. If TAS 106 does not receive a response from destination client device 126 to the SIP invite or if TAS 106 receives an indication from destination client device 126 that the invitation is rejected, communication session controller 102 may determine that the requested communication session will not be established.

TAS 106 may include one or more of a variety of computing or communication devices. For example, TAS 106 may include a computer, a server, a cluster of servers, or another type of device capable of operating in a network environment. In some implementations, TAS 106 may include a back-to-back SIP user agent capable of maintaining call states. Additionally, or alternatively, TAS 106 may provide various telephony services that may not be directly related to routing network messages. For example, TAS 106 may provide telephony services, such as call waiting, call forwarding, call conferencing, or other types of services relating to communication sessions. In some embodiments, TAS 106 may not be implemented.

Client devices 124-1, 124-2, 126 can take the form of portable handsets, smart-phones, personal digital assistants, personal computers, laptops, and/or other types of communication devices, although they may be implemented in other form factors. Client devices 124-1, 124-2, 126 may connect to network 130 via wired and/or wireless connections. Program applications, including one or more applications to assist in the VVM messaging service can be configured to execute on many different types of client devices 124-1, 124-2, 126. For example, a client device application can be written to execute on a binary runtime environment for mobile (BREW-based) client devices, a Windows Mobile based client device, Android, iOS for I-Phone or iPad, Java Mobile, or RIM based client device such as a BlackBerry or the like. Some of these types of devices can employ a multi-tasking operating system.

VVM service-capable client device 124-1 is configured to present a message request to a user of VVM service-capable client device 124-1, responsive to an indication that the requested session will not be established with the destination device, received from the communication session controller 102. Source device 124-1 receives a message generated by the user of the source client device 124-1 for the destination device 126 responsive to the message request. Source device 124-1 generates a FT message from the received message which is addressed to destination client device 126 and sends the FT message to messaging server 104. The message generated by the source client device 124-1 includes at least one of video or audio information (i.e., to form a VVM message). The FT message is generated according to a predetermined file transfer protocol. In one example, the FT message is generated according to message session relay protocol (MSRP). It is understood that other suitable file transfer protocols may be used, such as, without being limited to Internet message access protocol (IMAP) and Hypertext Transfer Protocol (HTTP).

Referring to FIGS. 2A and 2B, functional components of VVM service-capable device 124-1 are further described. In particular, FIG. 2A is a high-level functional block diagram of a few elements of a client device (such as client device 124-1) as may utilize the VVM messaging service; and FIG. 2B is an example of a VVM menu 210 that may be utilized for generating a message request for the VVM messaging service using VVM service-capable device 124-1.

FIG. 2A illustrates a video/voicemail application 202 and FT messaging application 204 which may be contained within the VVM service-capable device 124-1 illustrated in FIG. 1. VVM service-capable device 124-1 may function as a communication device in connection with any other type of voice/videomail system.

VVM service-capable device 124-1 may contain computer storage media 206 which may have stored therein video/voicemail application 202 and FT messaging application 204. Computer storage media 206 may be of any type. For example, computer storage media 206 may include one or more of RAMs, ROMs, EPROMs, hard disk drives, CD's, DVD's and/or flash memories.

Video/voicemail application 202 and FT messaging application 204 may each include one or more software applications which include algorithms, each performing one of the functions which are described herein for video/voicemail application 202 and FT messaging application 204 when loaded in and run by a processing system, such as a microprocessor-based system or the like within VVM service-capable device 124-1.

Video/voicemail application 202 may be configured to receive an indication from communication session controller 102 to present a message request to a user of source client device 124-1. Responsive to the indication, video/voicemail application 202 may cause a VVM message request menu to be displayed on VVM service-capable device 124-1. For example, VVM menu 210, shown in FIG. 2B, may be displayed. Video/voicemail application 202 may also cause VVM service-capable device 124-1 to play audible sounds indicative of the message request. In general, VVM menu 210 may include options for sending a video mail message, a voice mail message, a video, etc.

Responsive to the displayed VVM message request menu on VVM service-capable device 124-1, video/voicemail application 202 may be configured to receive a selection from a user of client device 124-1 requesting generation of a VVM message. In turn, video/voicemail application 202 may be configured to cause client device 124-1 to capture (i.e., receive) a VVM message from the user of client device 124-1 that includes at least one of video or audio information.

FT messaging application 204 may be configured to receive the generated VVM message from video/voicemail application 202 and to generate a FT message according to a predetermined file transfer protocol such that the FT message is addressed to destination client device 126. In one example, the file transfer protocol includes MSRP. MSRP is typically used in RCS for instant messaging, file transfer and image sharing. The MSRP protocol is defined in RFC 4975. MSRP has a similar syntax to SIP, i.e. follows the request and response model. Although it is described herein that these protocols and services may be used in the example embodiments of the present invention, it should be understood that any suitable protocols may be used to realize the disclosed concepts of the present invention.

FT messaging application 204 may be configured to send the FT message to messaging server 104 (FIG. 1) according to the predetermined file transfer protocol. For example, when MSRP is used, FT messaging application 204 may send an invite message to messaging server 104 which is addressed to destination client device 126. The invite message (to messaging server 104 may request a file transfer session between source client device 124-1 and destination client device 126 (which is proxied through messaging server 104). Responsive to an acknowledgement message (in response to the invite message), a file transfer session may be established in which the FT message is sent to the messaging server 104.

Referring back to FIG. 1, VVM service-incapable device 124-2 is configured to present a message request to a user of VVM service-incapable device 124-2 (via a prompt received from messaging server 104), responsive to the indication from the communication session controller 102 that that the requested session will not be established with the destination device 126. A VVM message is generated by a user of source client device 124-2 responsive to the message request. The source device 124-2 sends the VVM message to messaging server 104. Messaging server 104 may generate a FT message from the received VVM message according to a predetermined file transfer protocol which is addressed to destination client device 126. The message generated by the source client device 124-2 includes at least one of video or audio information (i.e., to form the VVM message). The message request and the received VVM message may be generated via communication between source client device 124-2, communication session controller 102, call termination server 114 and MRF 116 (described further with respect to FIG. 5). In one example, MRF 116 is directed to play a greeting retrieved from messaging server 104, receive touch tones and record the VVM message (under control of messaging server 104) from VVM service-incapable device 124-2.

Messaging server 104 is configured to temporarily store the FT message (received from VVM service-capable device 124-1 or generated at messaging server 104 for VVM service-incapable device 124-2) and to send the FT message to destination client device 126, without maintaining a stored copy of the FT message on messaging server 104. For example, messaging server 104 receives an indication from destination client device 126 confirming receipt of the FT message. Responsive to this indication, messaging server 104 deletes the temporarily stored message (such as from temporary storage 306 (FIG. 3).

Referring to FIG. 3, a high-level functional block diagram of an example of messaging server 104 is shown. Messaging server 104 may include VVM application server (VVM AS) 302, converged IP messaging (CPM) server 304 and temporary storage 306. VVM AS 302 handles call control. For example, when a call originates from source client device 124-1, 124-2 for destination client device 126 (which is unavailable) the call is typically diverted to VVM AS 302, which handles signaling call completion and provides directions to MRF 116 regarding playing prompts, receiving touch tones and recording messages. CPM server 304 may handle storing and forwarding of files, and may not be involved with call signaling. CPM server 104 may also handle notification messages that are sent to destination client device 126 via SMPP gateway 112.

As discussed above, temporary storage 306 temporarily stores the FT message until it is delivered to destination client device 126. Temporary storage 306 may be of any type. For example, temporary storage 306 may include one or more of RAMs, ROMs, EPROMs, hard disk drives, CD's DVD's and/or flash memories.

Referring back to FIG. 1, in an example embodiment, the FT message may be saved in cloud storage 110, for long-term storage of the FT message. The FT message may be sent to cloud storage via messaging server 104 or destination client device 126. The FT message may, thus, be permanently or temporarily stored in cloud storage 110 (without permanent storage by messaging server 104).

Cloud storage 110 may include one or more data storage media, devices, or configurations and may employ any type, form, and combination of data storage media and/or device. For example, cloud storage 110 may include, one or more of RAMs, ROMs, EPROMs, hard disk drives, CD's DVD's and/or flash memories.

In an example embodiment, messaging server 104 may send a notification message to destination client device 126 as an SMS message via Short Message Peer-to-Peer (SMPP) protocol gateway 112. The notification message may indicate that message transfer of the FT message to destination client device 126 can be begin (i.e., that the FT message is ready for transfer). The notification message may be sent to destination client device 126, for example, if destination client device 126 is roaming and is unable to receive the FT message (or the data transfer speed is below a predetermined rate). For example, if the messaging server 104 sends the FT message and does not receive an acknowledgement that the FT message was received by destination client device 126, messaging server 104 may send a notification message to destination client device 126 via SMPP gateway 112. When the destination client device 126 is no longer roaming, the user of the destination client device 126 can retrieve the FT message from messaging server 104.

Wireless carriers developed the SMS to transmit text messages for display on mobile devices. In many existing network architectures, the SMS traffic uses the signaling portion of the network 130 to carry message traffic between a SMS messaging center (SMSC) (not shown) of network 130 and client devices 124-1, 124-2, 126. The SMSC supports client device to client device delivery of text messages. However, the SMSC also supports communication of messages between the client devices 124-1, 124-2, 126 and devices coupled to other networks. For this later type of SMS related communications, the network 130 also includes one or more Short Message Peer-to-Peer (SMPP) protocol gateways 112. The SMPP gateway 112 provides protocol conversions, between the SMPP as used by the SMSC and the protocols used on the Internet or other IP networks. SMPP messages ride on IP transport, e.g., between the SMPP gateway 112 and the SMSC.

As discussed above, for VVM service-incapable device 124-2, communication session controller 102 may communicate with call termination server 114, MRF 116 and messaging server 104 to generate the FT message. Specifically, if the requested session will not be established, communication session controller 102 sends an indication to call termination server 114 to terminate the requested communication request and to present a message request (e.g., if the destination client device 126 supports the VVM messaging service). Communication session controller 102 also controls MRF 116 to cause source client device 124-2 to present the message request. MRF 116 causes source client device 124-2 to generate the VVM message and to send the VVM message to messaging server 104.

Call termination server 114 may include hardware or a combination of hardware and software that may receive a request for notification of termination of the requested communication session from communication session controller 102. Based on the request that the requested session is terminated, call termination server 114 may notify MRF 116 that the requested communication session is terminated and to proceed to cause source client device 124-2 to present a message request.

MRF 116 provides media related functions such as media manipulation (e.g. voice stream mixing), video transcoding, dual-tone multi-frequency (DTMF) recognition, recording, playback and playing of tones and announcements. MRF 116 also manages and distributes media resources (e.g., recordings and buffered content) among components of system 100 and client devices 124-1, 124-2, 126.

Call termination server 114 (via communication session controller 102) commands MRF 209 to cause source client device 124-2 to present a message request (for sending a VVM message to destination client device 126) and to collect the VVM message according to the user's request and send the VVM message to messaging server 104. For example, MRF 116 may initiate a communication session with source client device 124-2 (such as via SIP) and may use the Relay Transfer Protocol (RTP) to facilitate communication. In general, MSRP is typically used in RCS for instant messaging, file transfer and image sharing while RTP is used for video sharing.

MRF 116 sends the VVM message to VVM AS 302 (FIG. 3) of messaging server 104, for generation of the FT message from the VVM message. VVM AS 302 may also convert the recorded session to any format requested by the user (e.g., voice mail, E-mail, SMS, MMS, etc.). MRF 116 (and VVM AS 302) may communicate with additional subsystems such as directory server 118 and/or voice-to-text server (to help convert one media format to another, such as creation of a speech-to-text transcript of a voice communication session). Directory server 118 can perform directory lookups and can be used for controlling the lookup of Caller-ID information.

In an example embodiment, system 100 provides a user interface, e.g., web portal 122 or otherwise networked application, to permit user access to the features and functionality of system 100 via client devices 124-1, 124-2, 126 or other computer-type devices (e.g., personal computers, laptop computers, etc.). According to certain embodiments, web portal 122 may be configured for exchanging information between client devices 124-1, 124-2, 126 and a web browser or other network-based application or system, such as a voice browser or interactive voice recognition system. Web portal 122 may also be used by client devices 124-1, 124-2, 126 for access to the VVM messaging service, such as for activation of the service, cancellation of the service and/or for configuration of the service.

Client devices 124-1, 124-2, 126 communicate through the traffic network 130 for various voice and data communications. If the network carrier offers the VVM messaging service, the service may be hosted on system 100, for communication via the network 130. For a given service, including the VVM messaging service, an application program within the client device may be considered as a 'client' and the programming at system 100 may be considered as the 'server' application for the particular service. Implementation of the VVM messaging service may involve some execution of programming in the client devices as well as implementation of user input/output functions and data communications through the network 130, from the client device.

Referring next to FIG. 4, the example of voice/videomail messaging systems and signal flows for a VVM communication from VVM service-capable source client device 124-1 is described. Communication session controller 102 receives communication session request 402 from VVM service-capable device 124-1 for communication with destination device 126, e.g. as a request for a video call or a request for a voice call. Responsive to communication session request 402, communication session controller 102 determines whether the requested session will be established with destination device 126.

In one example, communication session controller 102 sends a request 403 to TAS 106 to request establishment of a SIP session between source device 124-1 and destination device 126. Responsive to the request 403 by communication session controller 102, TAS 106 sends a SIP invite message 404 to destination device 126. TAS 106 may receive a call reject response message or no response (designated generally as indication 406) from destination device 126. The response (or lack of response) 406 is sent as response 408 to communication session controller 102 for determining whether the requested session will be established.

When communication session controller 102 determines that the requested session will not be established with destination device 126 (via TAS 106), communication session controller 102 sends a request 410 to source device 124-1 to present a message request for communication with destination device 126.

Responsive to request 410, source device 124-1 is caused to present a message request, such as to display a VVM menu 412 (such as menu 210 shown FIG. 2B) to a user of source device 124-1. Responsive to the display of VVM menu 412, source device 124-1 receives a request from the user of device 124-1 to generate a VVM message. Responsive to the user's selection, source device 124-1 captures the VVM message 414 generated by the user. Depending, for example, on user selection, the received mail message may contain audio and/or video input from the user of the device 124-1. A FT message addressed to destination device 126 is generated at 416 via source device 124-1. The FT message is generated via source device 124-1 from the VVM message according to a predetermined file transfer protocol. The FT message 418 is sent from source device 124-1 to messaging server 104 and the FT message 418 is temporarily stored at messaging server 104.

Messaging server 104 then sends FT message 420 to destination device 126. When messaging server determines that the FT message 420 is successfully received at destination device 126, a copy of the FT message stored on messaging server 104 is deleted.

In one example, messaging server 104 sends an SMS notification message 422 to destination device 126 indicating that message transfer of the FT message 420 can begin. The SMS notification message is sent by messaging server 104 via SMPP gateway 112. The notification message 422 may be sent if messaging server 104 determines that destination device 126 is roaming (or does not receive a response from destination device 126).

In another example, the FT message 424 is stored in long term storage, such as in cloud storage 110. The FT message 424 may be sent to cloud storage 110 via messaging server 104 or via destination device 126.

Figure 5:
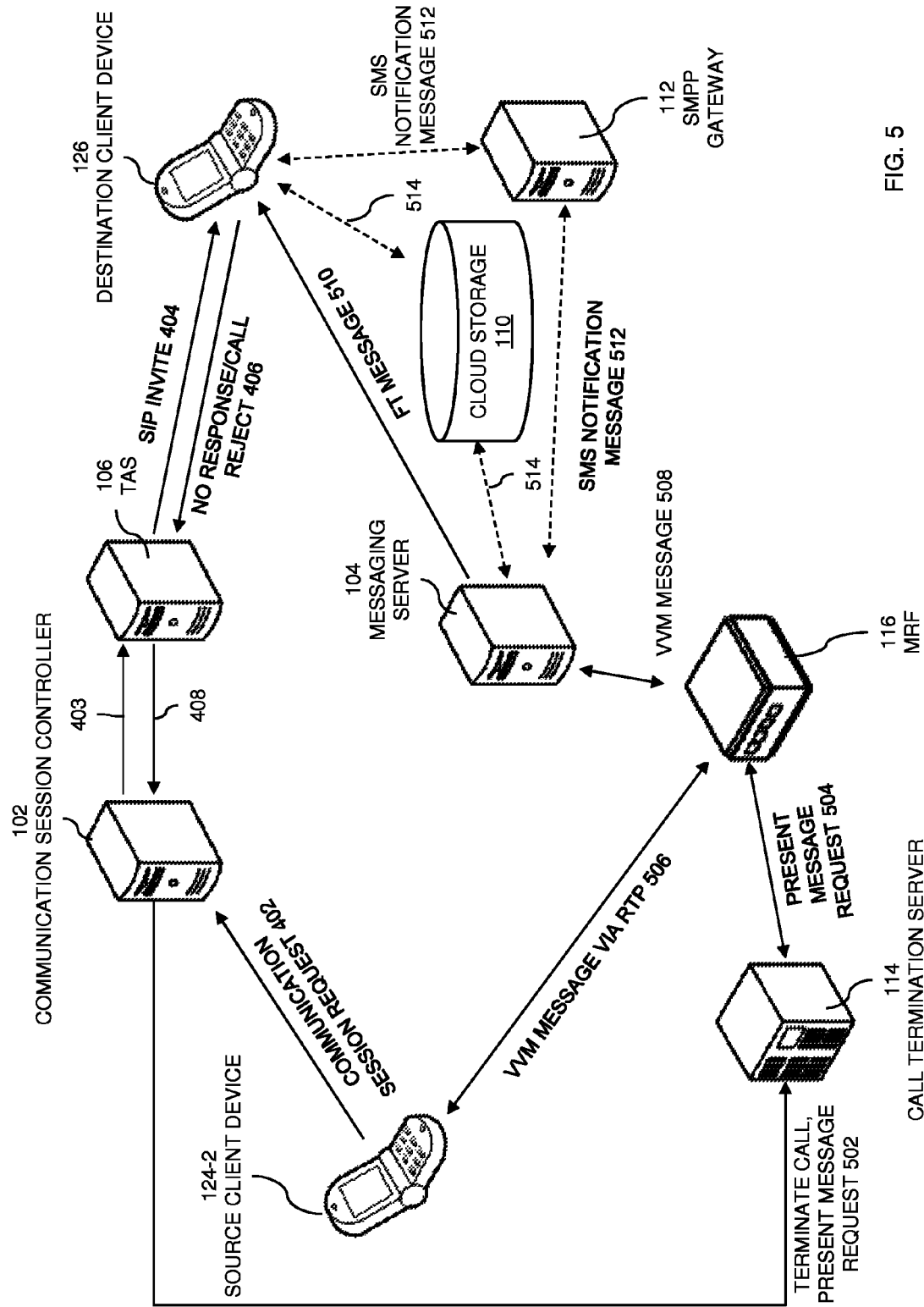
FIG. 5 is a high-level functional block diagram conceptually illustrating voice/videomail messaging systems and services for a voice/videomail service-incapable source client device.

Referring next to FIG. 5, an example of voice/videomail messaging systems and signal flows for a VVM communication from a VVM service-incapable source client device 124-2 is described. In FIG. 5, the determination by communication controller 102 of whether a communication session request 402 received from source device 124-2 will be established with destination device 126 is the same as described above relative to FIG. 4.

When communication session controller 102 determines that the requested session will not be established with destination device 126 (via TAS 106), communication session controller 102 sends a request 502 to call termination server 114 to terminate the call and to cause source device 124-2 to present a message request to the user of the source device.

Responsive to request 502, call termination server 114 terminates the call and sends request 504 to MRF 116 to cause source device 124-2 to present the message request. MRF 116 communicates with source device 124-2 to generate and send the VVM message to MRF 116 via RTP (designated generally as signaling 506). MRF 116 sends the VVM message 508 to messaging server 104.

Messaging server 104 generates a FT message (according to a predetermined file transfer protocol) addressed to destination device 126 from the VVM message 508 and temporarily stores the FT message. Messaging server 104 then sends FT message 510 to destination device 126. When messaging server determines that the FT message 510 is successfully received at destination device 126, a copy of the FT message stored on messaging server 104 is deleted.

In one example, messaging server 104 sends an SMS notification message 512 to destination device 126 indicating that message transfer of the FT message can begin. The SMS notification message 512 is sent from messaging server 104 via SMPP gateway 112. In another example, the FT message 514 is stored in long term storage, such as in cloud storage 110. The FT message 514 may be sent to cloud storage 110 via messaging server 104 or via destination device 126.

Figure 6:
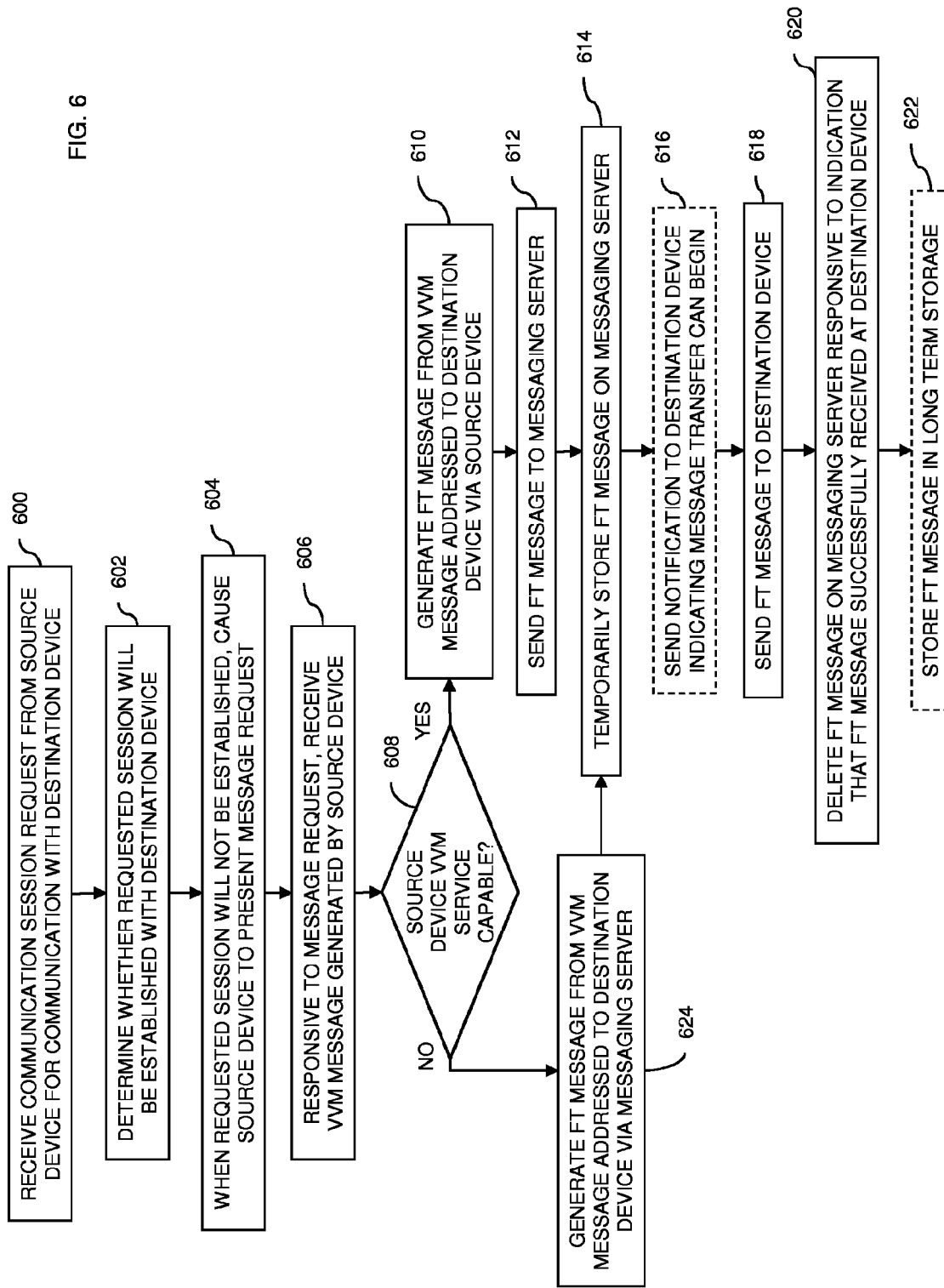
FIG. 6 is a flow chart of an example method for voice/videomail messaging for a client device.

Referring now to FIG. 6, a process flow diagram of an example of a method for VVM messaging is described. FIG. 6 is described below with reference to FIGS. 4 and 5, which provide examples of VVM messaging methods.

At step 600, a communication session request is received, for example, by communication session controller 102 from source device 124 (such as VVM service-capable device 124-1 as shown in FIG. 4 or from VVM service-incapable device 124-2 as shown in FIG. 5), for communication with destination device 126. At step 602, it is determined whether the requested session (step 600) will be established with destination device 126, for example, by communication session controller 102.

Figure 7:
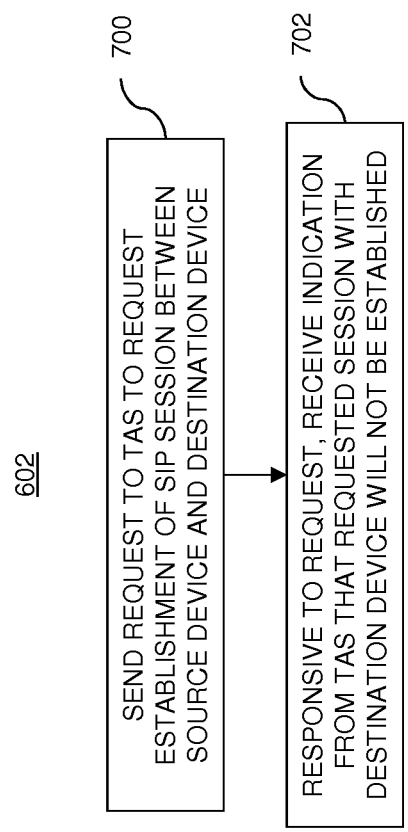
FIG. 7 is a flow chart of a method for determining whether a requested communication session can be established, according to an example embodiment.

FIG. 7 is a flow chart of an example of method for determining whether a requested session will be established (step 602) (responsive to receiving the communication session request).

In FIG. 7, at step 700, a request is sent by communication session controller 102 to TAS 106 to request establishment of a SIP session between source device 124-1, 124-2 and destination device 126. At step 702, responsive to the request, communication session controller 102 receives an indication from TAS 106 that the requested session with destination device 126 will not be established.

For example, as shown in FIGS. 4 and 5, TAS 106, responsive to the request by communication session controller 102, sends a SIP invite message to destination device 126. TAS 106 may receive a call reject response message or no response from destination device 126. The response (or lack of response) is sent to communication session controller 102 for determining whether the requested session will be established.

Referring back to FIG. 6, at step 604, when the requested session will not be established with destination device 126 (step 602), communication session controller 102 causes the source device 124-1, 124-2 to present a message request to a user of source device 124-1, 124-2.

For example, as shown in FIG. 4 for VVM service-capable device 124-1, communication session controller 102 directly requests source device 124-1 to present a message request, causing source device 124-1 to display a VVM menu (such as menu 210 shown FIG. 2B) for requesting generation of a VVM message for destination device 126.

As another example, as shown in FIG. 5 for VVM service-incapable device 124-2, communication session controller 102 indirectly requests, via call termination server 114 and MRF 116, source device 124-2 to present a message request. Communication session controller 102 requests call termination server 114 to terminate the call for source device 124-2, and sends a request to present the message request to MRF 116 via call termination server 114. In one example, the call termination and message presentation may be sent from communication session controller 102 to call termination server 114 as one message (i.e., as a combined request). MRF 116 presents the message request (to the user of source client device 124-2) for generation of a VVM message for destination device 126, via communication with source device 124-2.

At step 606, responsive to the message request, a VVM message generated by source device 124-1, 124-2 is received. For example, as shown in FIG. 4 for VVM service-capable device 124-1, the VVM message is received from the user of source device 124-1 directly at source device 124-1, such as by video/voicemail application 202 shown in FIG. 2A. As another example, as shown in FIG. 5 for VVM service-incapable device 124-2, the VVM message is received from source device 124-1 by MRF 116 via RTP communication.

At step 608, it is determined whether source device 124 is a VVM service-capable device. If source device is a VVM service-capable device (such as VVM service-capable device 124-1 shown in FIG. 4), step 608 proceeds to step 610.

At step 610, a FT message is generated from the VVM message according to a predetermined file transfer protocol via source device 124-1 (such as by FT messaging application 204 shown in FIG. 2A). The FT message is addressed to destination device 126. At step 612, the FT message is sent from source device 124-1 to messaging server 104. At step 614, the FT message is temporarily stored at messaging server 104 (such as in temporary storage 306 shown in FIG. 3).

At optional step 616, messaging server 104 sends a notification message to destination device 126 indicating that message transfer of the FT message (at messaging server 104) can begin. For example, messaging server 104 may send the notification message to destination device 126 as an SMS message via SMPP gateway 112, if messaging server 104 determines that destination device 126 is roaming (or does not receive a response from destination device 126).

At step 618, the FT message is sent from messaging server 104 to destination device 126, for storage at destination device 126. For example, messaging server 104 may send the FT message to destination device 126 without sending a notification message (step 616) or after sending the notification message. As another example, messaging server 104 may send the FT message to destination device 126 when it determines that destination device 126 is capable of receiving the FT message (such as when destination device 126 is responsive or when destination device 126 is not roaming). The responsiveness of destination device 126 may be determined by message server 104 receiving an acknowledgement message from destination device 126 (indicating receipt of the FT message), or by any other suitable means.

At step 620, when it is determined that the FT message is successfully received at destination device 126, a copy of the FT message stored on messaging server 104 (such as in temporary storage 306) is deleted. As an example, the copy of the FT message may be deleted when messaging server 104 receives an acknowledgement message from destination device 126 indicating successful receipt of the FT message. As another example, the FT message may be deleted from messaging server 104 after a predetermined period of time, even if the FT message is not received by destination client 126.

At optional step 622, the FT message is stored in long term storage, such as in cloud storage 110. As shown in FIGS. 4 and 5, the FT message may be sent from messaging server 104 to cloud storage 110, or the FT message may be sent from destination device 126 to cloud storage 110.

In one example, messaging server 104 automatically sends the FT message to cloud storage 110 upon indication of successful receipt of the FT message by destination device 126. As another example, messaging server 104 or destination device 126 automatically sends the FT message to cloud storage 110 based on account preferences of destination device 126. For example, account preferences such as messages sent by particular users, messages flagged as important, messages having particular subject content, messages sent/received at a particular time of day, messages sent on a particular date, etc. may be used to identify FT messages for automatic long term storage in cloud storage 110. As another example, the FT message is sent (from messaging server 104 or destination device 126) to cloud storage 110 on a message by message basis, such as based on user selection via destination device 126.

If source device 124 is not a VVM service-capable device (i.e., is a VVM service-incapable device such as VVM service-incapable device 124-2 shown in FIG. 5), step 608 proceeds to step 624. At step 624, a FT message to destination device is generated from the VVM message via messaging server 104 (such as by VVM AS 302 shown in FIG. 3). The FT message is generated according to a predetermined file transfer protocol. Step 624 proceeds to step 614, and the process for VVM service-incapable device 124-2 proceeds through steps 614-622 as described above for VVM service-capable device 124-1.

As shown by the above discussion, functions relating to the VVM messaging service may be implemented on computers connected for data communication via the components of a packet data network, operating as the various servers as shown in FIG. 1. Although special purpose devices may be used, such devices also may be implemented using one or more hardware platforms intended to represent a general class of data processing device commonly used to run "server" programming so as to implement the VVM messaging functions discussed above, albeit with an appropriate network connection for data communication. Other aspects of the mail messaging service may involve or be implemented on user terminal devices, such as smartphones tablets or personal computers configured as the client devices as shown in FIG. 1.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the VVM messaging service. The software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for VVM messaging, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server, including the communication session controller 102 and messaging server 104 (FIG. 1). FIG. 9 depicts a computer with user interface elements, as may be used to implement a personal computer or other type of work station or terminal device, although the computer of FIG. 9 may also act as a server if appropriately programmed. It is believed that the general structure and general operation of such equipment as shown in FIGS. 8 and 9 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the VVM messaging methods outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix: Acronym List

The description above has a large number of acronyms to refer to various devices, messages and system components. Although generally known, use of several of these acronyms is not strictly standardized in the art. For the convenience of the reader, the following list correlates terms to acronyms, as used by way of example in the detailed description above.

BREW—Binary Runtime Environment for Mobile
CD-ROM—Compact Disk Read Only Memory
CPM—Converged Internet Protocol Messaging
CPU—Central Processing Unit
CSCF—Call Session Control Function
DVD—Digital Video Disk
DVD-ROM—Digital Video Disk Read Only Memory
EPROM—Erasable Programmable Read Only Memory
EEPROM—Electrically Erasable Programmable Read Only Memory FLASH-EPROM—Flash Erasable Programmable Read Only Memory
HSS—Home Subscriber Server
HTTP—Hypertext Transfer Protocol
I-CSCF—Interrogating Call Session Control Function
IMAP—Internet Message Access Protocol
IMS—Internet Protocol Multimedia Subsystem
IP—Internet Protocol
LTE—Long Term Evolution
MMS—Multimedia Messaging Service
MRF—Media Resource Function
MSRP—Message Session Relay Protocol
P-CSCF—Proxy Call Session Control Function
PROM—Programmable Read Only Memory
PSTN—Public Switched Telephone Network
RAM—Random Access Memory
RCS—Rich Communication Suite
RIM—Research in Motion
ROM—Read Only Memory
RTP—Real-time Transport Protocol
S-CSCF—Serving Call Session Control Function
SIP—Session Initiation Protocol
SMPP gateway—Short Message Peer-to-Peer gateway
SMS—Short Message Service
SMSC—Short Message Service Messaging Center
TAS—Telephony Application Server
UE—User Equipment
VVM message—Voice/Videomail message

What is claimed is:

1. A method comprising:
receiving, through a network, a request for a communication session from a source device to a destination device via a call from the source device to the destination device, wherein the source device and the destination device are mobile devices;
responsive to the request, determining that the communication session will not be established with the destination device;
sending a request to a call termination server to terminate the call;
causing, in response to determining that the communication session will not be established, a video/voicemail (VVM) application of the source device to present, to a user of the source device, a menu, wherein the menu includes a plurality of options for recording, via the VVM application, and sending, via a file transfer (FT) messaging application of the source device, a plurality of types of messages, and wherein the plurality of options includes an option for recording, via the VVM application, and sending, via the FT messaging application, an audio message and another option for recording, via the VVM application, and sending, via the FT messaging application, a video message, wherein, in response to receiving a selection of an option of the plurality of options, the VVM application records a particular message and the FT messaging application receives the particular message and generates a FT message, based on the particular message, according to a predetermined file transfer protocol so that the FT message is addressed to the destination device;
receiving the FT message addressed to the destination device;
sending, to the destination device, a short messaging service message indicating that a transfer of the FT message can begin;
temporarily storing the FT message on a messaging server; and
sending, through the network, the FT message to the destination device via the messaging server, without maintaining a stored copy of the FT message on the messaging server after the FT message is received by the destination device.

2. The method of claim 1, further comprising:
receiving an indication by the messaging server, via the network, from the destination device that the FT message is successfully received by the destination device; and
responsive to the indication that the FT message is successfully received, deleting the temporarily stored FT message from the messaging server.

3. The method of claim 1, wherein receiving the FT message includes:
generating the FT message from the particular message by the source device; and
sending the FT message from the source device to the messaging server via the network.

4. The method of claim 1, further comprising:
sending the FT message to a storage device for long term storage of the FT message when the FT message is sent to the destination device.

5. The method of claim 1, further comprising:
sending, prior to sending the FT message to the destination device, a notification message to the destination device via a messaging service gateway, the notification message indicating that message transfer of the FT message can begin.

6. The method of claim 1, wherein the predetermined file transfer protocol includes at least one of a message session relay protocol (MSRP), an Internet message access protocol (IMAP), or a Hypertext Transfer Protocol (HTTP).

7. The method of claim 1, wherein determining that the communication session will not be established includes:
sending a session initiation protocol (SIP) invite message to the destination device via a telephony application server (TAS); and
determining that the communication session will not be established based on at least one of a content of a response or a lack of a response to the SIP invite message from the destination device.

8. A system comprising:
a communication system controller configured to:
receive, through a network, a request for a communication session from a source device to a destination device via a call from the source device, wherein the source device and the destination device include mobile devices,
determine the communication session will not be established with the destination device,
send a request to a call termination server to terminate the call, and
cause, in response to determining that the communication session will not be established, a video/voicemail (VVM) application of the source device to present a menu to a user of the source device, wherein the menu includes options for recording, via the VVM application, and sending, via a file transfer (FT) messaging application of the source device, a plurality of types of message, wherein the options include an option for recording, via the VVM application, and sending, via the FT messaging application, an audio message and another option for recording, via the VVM application, and sending, via the FT messaging application, a video message, wherein a particular message is generated by the user of the source device for the destination device, wherein the particular message is a type of message of the plurality of types of messages, and wherein the message includes at least one of video or audio information; and a messaging server configured to:
temporarily store a FT message produced from the particular message according to a predetermined file transfer protocol, the FT message being addressed to the destination device,
send, to the destination device, a short messaging service message indicating that a transfer of the FT message can begin; and
send, through the network, the FT message to the destination device via the messaging server, without maintaining a stored copy of the FT message on the messaging server after the FT message is sent to the destination device.

9. The system of claim 8, further comprising a storage device configured to receive the FT message for long term storage.

10. The system of claim 8, wherein the menu includes an option for recording a video mail message.

11. The system of claim 8, wherein the source device is configured to:
produce the FT message from the particular message, and send the FT message to the messaging server via the network.

12. The system of claim 8, further comprising a telephony application server (TAS), wherein the communication system controller is configured to determine that the communication session will not be established with the destination device via an indication from the TAS.

13. The system of claim 8, further comprising a messaging service gateway configured to send a notification message to the destination device via the messaging service gateway, the notification message indicating that message transfer of the FT message can begin.

14. The system of claim 8, further comprising a Media Resource Function (MRF) device configured to communicate with the source device and the messaging server to cause the source device to present the menu and to generate the particular message.

15. The system of claim 8, wherein the messaging server is configured to delete the temporarily stored FT message from the messaging server responsive to an indication that the FT message is successfully received by the destination device.

16. A non-transitory computer readable medium that stores instructions executable by one or more network devices to cause the one or more network devices to:
receive, through a network, a request for a communication session from a source device to a destination device via a call from the source device, wherein the source device and the destination device include mobile devices;
determine whether the communication session will be established with the destination device;
send a request to terminate the call and cause a video/voicemail (VVM) application of the source device to present a menu to a user of the source device, responsive to an indication that the communication session will not be established with the destination device, wherein the menu includes a plurality of options for recording, via the VVM application, and sending, via a file transfer (FT) messaging application of the source device, different types of messages, wherein the plurality of options includes an option for recording, via the VVM application, and sending, via the FT messaging application, an audio message and another option for recording, via the VVM application, and sending, via the FT messaging application, a video message, wherein a particular message is generated by the user of the source device for the destination device based on a selection, by the user, of an option of the plurality of options, and wherein the particular message includes at least one of video or audio information;
temporarily store, at a messaging server, a file transfer (FT) message produced from the particular message according to a predetermined file transfer protocol, wherein the FT message is addressed to the destination device;
send, to the destination device, a short messaging service message indicating that a transfer of the FT message can begin; and
send, through the network, the FT message to the destination device via the messaging server, without maintaining a stored copy of the FT message on the messaging server after the FT message is sent to the destination device.

17. The non-transitory computer readable medium of claim 16, wherein the FT message is produced from the particular message by the source device such that the messaging server receives the FT message from the source device via the network.

18. The non-transitory computer readable medium of claim 16, wherein the predetermined file transfer protocol includes at least one of a message session relay protocol (MSRP), an Internet message access protocol (IMAP), or a Hypertext Transfer Protocol (HTTP).

19. The non-transitory computer readable medium of claim 16, wherein the executable instructions further cause the one more network devices to:
send the FT message to a storage device for long term storage of the FT message when the FT message is sent to the destination device.

20. The non-transitory computer readable medium of claim 16, wherein the executable instructions further cause the one more network devices to:
send, prior to sending the FT message to the destination device, a notification message to the destination device via a messaging service gateway, the notification message indicating that message transfer of the FT message can begin.

* * * * *